June 14, 1960
A. FREYLER
2,940,552
FRICTIONAL SHOCK ABSORBER
Filed Feb. 21, 1958
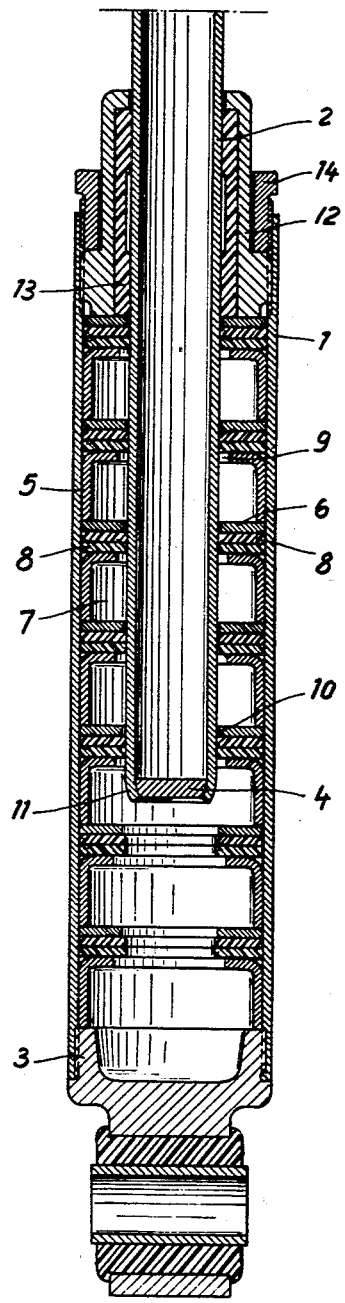
Inventor
ADALBERT FREYLER
BY Robert H. Jacob
AGENT

United States Patent Office 2,940,552
Patented June 14, 1960

2,940,552
FRICTIONAL SHOCK ABSORBER

Adalbert Freyler, Hirschstrasse 84, Wuppertal-Barmen, Germany

Filed Feb. 21, 1958, Ser. No. 716,719

Claims priority, application Germany Feb. 22, 1957

4 Claims. (Cl. 188—129)

The invention relates to a telescopic shock absorber, particularly for motor vehicles, which consists of a cylindrical tube to be fitted on a part of the vehicle and a part slidable therein to be fitted on another part of the vehicle, and which offers greater resistance to being pulled out of the cylindrical tube than to being pushed therein.

It is a known fact that as the travelling speeds of motor vehicles increase, greater demands are made upon the shock absorbers of these vehicles which are required to absorb as quickly as possible even heavy shocks caused by unevennesses in the road or track. After the compression of the springs of the vehicle by a shock, the shock absorbers are required to prevent the sudden and strong recoil of the springs and to avoid the heavy vibrations of the chassis otherwise cause thereby. For this purpose the shock absorbers should, as far as possible, exert a braking effect only in one direction, namely in the direction of the spring recoil. Furthermore, the shock absorbers should offer to the compression of the springs a resistance increasing from a minimum value, that is have an elasticity characteristic gradually becoming steeper, so as to prevent, in the case of heavy shocks a break-through of the cushioning which is so much dreaded, so disagreeable for the driver and harmful to the vehicle, and to maintain a certain floating or suspended state in normal load position so as to ensure smooth and quiet running of the vehicle in spite of unevenesses in the track.

In the known telescopic shock absorbers operating with braking fluid with overflow valves for allowing the braking medium to flow from one side of a piston to the other, the shock absorber always offers the same relatively great resistance to the compression of the springs during deflection. The valves are parts which can give rise to trouble.

In as far as telescopic shock absorbers operating with air cushioning and piston brake have been proposed, these can be constructed so that theoretically they operate in an almost perfect manner. However, they are open to the objection that they can only take into account to an unsatisfactory extent variations in the loading of the vehicle. This also applies as regards the heaviness of the shocks. Moreover the heat generated when the shock absorber responds influences its operation.

The object of the invention is to produce a shock absorber which, independently of packing conditions, automatically takes into account the different loading of the vehicle and shock deflections and whose operation is not affected by heat or developing heat.

According to the invention, the cylinder is divided into a plurality of chambers located one behind the other in the direction of its axis, with passages interconnecting these chambers in axial direction, and accommodates a plunger rod constructed as a slidable part for penetrating the chambers, whereby coordinated to the walls separating the chambers are elastic discs each provided with a passage of a size corresponding to the cross-section of the plunger rod, the passages in the chamber walls on the side of the intermediate discs remote from the side on which the plunger rod enters being larger than on the side of the intermediate discs facing the side from which the plunger rod enters. In this manner a damper is produced which automatically adjusts itself to the different vehicle loads while at the same time carrying out its functions as a shock absorber, in that as the load increases, the plunger penetrates more deeply into the cylinder and consequently enters one chamber after another with the result that a gradually increasing number of intermediate discs, acting as brake discs, bear against the plunger rod and exert a greater braking force on the plunger. This also takes place in the case of heavier shocks. Owing to the passages in the chamber walls having different dimensions, the intermediate discs offer slighter resistance to the penetration of the plunger than to its withdrawal, thereby fulfilling the requirement that the recoil of the springs be more strongly checked. The shock absorber according to the invention operates independently of the air pressure which may arise in the cylinder by the insertion of the plunger because the operation of the shock absorber depends on friction.

The intermediate discs are preferably made from an elastic synthetic material resistant against ageing and abrasion, for example a synthetic substance based on poly-addition products, such as Vulkollan manufactured by the Farbenfabriken Bayer.

The chambers are preferably formed by pot-shaped inserts the external diameter of which corresponds to the internal diameter of the cylindrical tube, and cover discs separating the inserts from one another. These inserts and discs can be made easily and cheaply by pressing or stamping, primarily because accurate fit is not necessary.

A cylindrical nut is screwed into one end of the cylindrical tube and bears against one end of the column formed by the pot-shaped inserts therein. By tightening or loosening this cylindrical nut the elastic intermediate discs between the pot-shaped inserts are compressed more or less strongly with the result that on the nut being tightened the pressure exerted by the intermediate discs against the plunger is increased and consequently a greater braking force acts on the plunger so that it is possible to adjust the shock absorber by means of the cylindrical nut.

An embodiment of the invention is illustrated by way of example in longitudinal section in the only figure of the accompanying drawing.

The telescopic shock absorber comprises a cylindrical tube 1 and a plunger rod 2. The cylindrical tube is fixed at its closed end 3 on a part of the vehicle which is not spring-supported, whereas the plunger rod 2 is connected to a spring-supported part of the vehicle. The plunger rod 2 in the example illustrated, is constructed as a length of tube and provided with a closing member or plug 4 at its end penetrating the cylindrical tube.

A cylindrical tube is divided in axial direction into a plurality of chambers 7 by pot-shaped inserts 5 with cover discs 6. Two elastic discs 8 are interposed between the cover disc 6 of one insert and the bottom of the neighbouring insert 5, these elastic discs 8 being made of plastic material, such as synthetic material based on poly-addition products or poly-condensation products. The pot-shaped inserts and cover discs as well as the elastic intermediate discs have passages for the plunger rod. While the passages in the pot-shaped inserts and in the cover discs are of larger diameter than the external diameter of the plunger rod, the passages in the intermediate discs are of a size corresponding to the cross-section of the plunger rod and may even be smaller than this cross-section, so that they bear against the plunger rod snugly. The passages 9 in the bottoms of the pot-shaped inserts, that is the passages on the side of the intermediate discs remote from the side from which the plunger enters, are larger than the passages 10 in the cover discs, that is the passages on the side of the intermediate discs facing the side from which the plunger enters. The end 11 of the plunger rod penetrating the cylndrical tube is tapered by swaging or drawing in, with the result that the plunger can penetrate the elastic intermediate discs more easily.

A cylindrical nut 12 is screwed into the cylindrical tube at the end where the plunger enters. By tightening this cylindrical nut more or less the elastic intermediate discs are compressed more or less strongly. The cylindrical nut, which accommodates a sleeve 13 of synthetic material produced on the basis of poly-addition products or poly-condensation products, serves as guide for the plunger rod. A counter nut 14 locks the cylindrical nut in position.

The shock absorber operates in the following manner:

Depending upon the vehicle load, the plunger rod 2 enters more or less deeply into the cylindrical tube 1 and thereby penetrates a large or smaller number of intermediate discs 8. As a result, an increasing load and deeper penetration of the plunger meets with a correspondingly increasing braking force. Similarly, withdrawal of the plunger meets with correspondingly greater braking force if the plunger has penetrated more deeply into the cylinder.

Since the clearance 9 for the plunger 2 in the bottom portions of the pot shaped inserts 5 is greater than the clearance 10 in the cover plates 6 which are disposed at the side from which the plunger is inserted, the elastic discs 8 offer less friction or resistance to the entrance of the plunger rod 2, because they can yield inwardly, than they do when the plunger is withdrawn because the small clearance of discs 6 does not provide any possibility for the elastic discs 8 to yield.

I claim:

1. Telescopic shock absorber for motor vehicles comprising a cylindrical tube adapted to be secured at one end to one part of a vehicle and a plunger adapted to be secured to another vehicle part and movable relative to said tube, said tube being subdivided into a plurality of chambers disposed axially thereof presenting apertures adapted to receive said plunger, said chambers being defined by pot shaped inserts having an outer diameter corresponding to the inner diameter of said tube, an open end and a bottom provided with an aperture and being disposed endwise of one another to define a column in said tube, closure members fixedly disposed in said tube endwise of said column including one member presenting an aperture for passage of said plunger, a plurality of closure discs having apertures, one such member being disposed over the open end of each said pot shaped insert, said apertures in said discs being of smaller diameter than the apertures in the bottom of said pot shaped inserts, and a plurality of annular spacing discs of elastic material having apertures for the passage of said plunger of a diameter corresponding to that of said plunger at least one of said spacing discs being disposed intermediate the bottom of each said pot shaped insert and such said closure disc, said spacing discs being capable of yielding to the inward movement of said plunger to offer relatively smaller frictional resistance and being retained against following outward movement of said plunger by said closure discs thereby offering relatively greater frictional resistance.

2. Telescopic shock absorber for motor vehicles comprising a cylindrical tube adapted to be secured at one end to one part of a vehicle and a plunger adapted to be secured to another vehicle part and movable relative to said tube, said tube being subdivided into a plurality of chambers disposed axially thereof presenting apertures adapted to receive said plunger, said chambers being defined by pot shaped inserts having an outer diameter corresponding to the inner diameter of said tube, an open end and a bottom provided with an aperture and being disposed endwise of one another to define a column in said tube, closure members fixedly disposed in said tube endwise of said column including one member presenting an aperture for passage of said plunger, a plurality of closure discs having apertures, one such member being disposed over the open end of each said pot shaped insert, said apertures in said discs being of smaller diameter than the apertures in the bottom of said pot shaped inserts, and a plurality of annular spacing discs of elastic material having apertures for the passage of said plunger of a diameter corresponding to that of said plunger at least one of said spacing discs being disposed intermediate the bottom of each said pot shaped insert and such said closure disc, said spacing discs being capable of yielding to the inward movement of said plunger to offer relatively smaller frictional resistance and being retained against following outward movement of said plunger by said closure discs thereby offering relatively greater frctional resistance, one said closure member being defined by a nut screwed into one end of said tube and presenting a shoulder to engage said one end of said tube and a shoulder for engagement by said column.

3. Telescopic shock absorber for motor vehicles comprising a cylindrical tube adapted to be secured at one end to one part of a vehicle and a plunger adapted to be secured to another vehicle part and movable relative to said tube, said tube being subdivided into a plurality of chambers disposed axially thereof presenting apertures adapted to receive said plunger, said chambers being defined by pot shaped inserts having an outer diameter corresponding to the inner diameter of said tube, an open end and a bottom provided with an aperture and being disposed endwise of one another to define a column in said tube, closure members fixedly disposed in said tube endwise of said column including one member presenting an aperture for passage of said plunger, a plurality of closure discs having apertures, one such member being disposed over the open end of each said pot shaped insert, said apertures in said discs being of smaller diameter than the apertures in the bottom of said pot shaped inserts, and a plurality of annular spacing discs of elastic material having apertures for the passage of said plunger of a diameter corresponding to that of said plunger at least one of said spacing discs being disposed intermediate the bottom of each said pot shaped insert and such said closure disc, said spacing discs being capable of yielding to the inward movement of said plunger to offer relatively smaller frictional resistance and being retained against following outward movement of said plunger by said closure discs thereby offering relatively greater frictional resistance, one said closure member being defined by a nut screwed into one end of said tube and presenting a shoulder to engage said one end of said tube and a shoulder for engagement by said column, and the other said closure member including a threaded outer portion extending into the other end of said tube in threaded engagement therewith and presenting a shoulder for engagement with the other end of said column and a guiding sleeve for said plunger in axial alignment with said column.

4. A telescopic shock absorber for motor vehicles in accordance with claim 3 wherein said plunger is tapered to facilitate penetration of said chambers.

References Cited in the file of this patent

UNITED STATES PATENTS

| 2,431,716 | Waseige | Dec. 2, 1947 |

FOREIGN PATENTS

| 1,110,107 | France | Oct. 5, 1955 |
| 1,132,995 | France | Nov. 12, 1956 |
| 897,210 | Germany | Nov. 19, 1953 |